United States Patent
Forth et al.

(10) Patent No.: US 11,166,102 B2
(45) Date of Patent: Nov. 2, 2021

(54) DIGITAL MULTI-ZONE AUDIO SYSTEM

(71) Applicant: Juke Audio Inc., Manhattan Beach, CA (US)

(72) Inventors: John B. Forth, Manhattan Beach, CA (US); Yutong Gu, Manhattan Beach, CA (US)

(73) Assignee: JUKE AUDIO INC., Manhattan Beach, CA (US)

( * ) Notice: Subject to any disclaimer, the term of this patent is extended or adjusted under 35 U.S.C. 154(b) by 28 days.

(21) Appl. No.: 16/681,732

(22) Filed: Nov. 12, 2019

(65) Prior Publication Data

US 2020/0154204 A1 May 14, 2020

Related U.S. Application Data

(60) Provisional application No. 62/757,823, filed on Nov. 9, 2018.

(51) Int. Cl.
| | |
|---|---|
| *H04R 3/12* | (2006.01) |
| *G06F 3/16* | (2006.01) |
| *H04R 1/40* | (2006.01) |
| *H04R 27/00* | (2006.01) |

(52) U.S. Cl.
CPC .............. *H04R 3/12* (2013.01); *G06F 3/165* (2013.01); *H04R 1/403* (2013.01); *H04R 27/00* (2013.01); *H04R 2227/003* (2013.01); *H04R 2227/005* (2013.01); *H04R 2430/01* (2013.01)

(58) Field of Classification Search
CPC .......... H04R 3/12; H04R 1/403; H04R 27/00; H04R 2227/003; H04R 2227/005; H04R 2430/01; G06F 3/165
USPC .................... 381/2, 5, 77, 80, 104, 105, 124
See application file for complete search history.

(56) References Cited

U.S. PATENT DOCUMENTS

| | | | |
|---|---|---|---|
| 9,067,132 B1 * | 6/2015 | Bergeron | G09B 19/003 |
| 2010/0232263 A1 * | 9/2010 | Kalis | G06F 21/10 |
| | | | 369/30.06 |
| 2011/0026727 A1 * | 2/2011 | Braithwaite | H04L 12/2801 |
| | | | 381/77 |
| 2018/0108351 A1 * | 4/2018 | Beckhardt | G06F 3/167 |

\* cited by examiner

*Primary Examiner* — William A Jerez Lora
(74) *Attorney, Agent, or Firm* — Maschoff Brennan (57) ABSTRACT

An embedded computing device which receives and buffers one or more digital audio streams provided by wired or wireless devices such as computers, tablets and smart phones via a network. The streams are buffered to allow for delays and irregularities in the rate at which these streams are delivered. The streams are then distributed to a series of digital amplifiers while allowing each amplifier to play a chosen source at a volume level that is selected by a user. This embodiment reduces the number of required electronic components, delivers high quality audio because the system is entirely digital from source through amplification, and is energy efficient thereby minimizing the generation of waste heat. In addition, the invention allows for features such as limiting the volume for certain users, or for certain zones during specified periods of time, as well as features to diagnose and/or compensate for installation errors or problems.

20 Claims, 8 Drawing Sheets

DIGITAL MULTI-ZONE AUDIO SYSTEM

PRIORITY CLAIM

The present application claims priority to U.S. Provisional Application No. 62/757,823 which was filed on Nov. 9, 2018, which is incorporated herein by reference in its entirety.

FIELD OF THE INVENTION

The present invention relates to a networked device which is configured to receive a plurality of digital audio streams from at least one source connected to said network and provide audio output to a plurality of speakers in different locations, wherein each speaker plays an audio stream from a source as selected by a user using an application or web interface.

DESCRIPTION OF THE RELATED ART

Systems exist today that provide audio to numerous rooms or other locations in homes and a variety of multi-occupant buildings. These systems consist of devices that receive input from a variety of audio sources and provide amplification to drive speakers. For systems wherein the speakers are wired to a central location, these systems are complex to install, requiring the connection and/or configuration of a variety of components, which consume significant amounts of electricity and generate a lot of heat. These systems typically use analog signal processing at some point between the sources and speakers to select signal sources and relative volume levels for each of the zones. Certain systems use wireless speakers or distributed amplifies, each requiring their own power supplies, enclosures, signal processing and network interfaces.

BRIEF DESCRIPTION OF THE INVENTION

In one embodiment of the present invention, a device receives and buffers one or more digital audio streams provided by wired or wireless devices such as computers, tablets and smart phones via a network. The streams are buffered to allow for delays and irregularities in the rate at which these streams are delivered. The streams are then distributed to a series of digital amplifiers while allowing each amplifier to play a chosen source at a volume level that is selected by a user. This embodiment reduces the number of required electronic components, delivers high quality audio because the system is entirely digital from source through amplification, and is energy efficient thereby minimizing the generation of waste heat. In addition, the invention allows for features such as limiting the volume for certain users, or for certain zones during specified periods of time, as well as features to diagnose and/or compensate for installation errors or problems. An embodiment of this invention provides an easy-to-use interface to a smartphone, tablet or computer to configure and operate the system.

DETAILED DESCRIPTION

Figure 1:
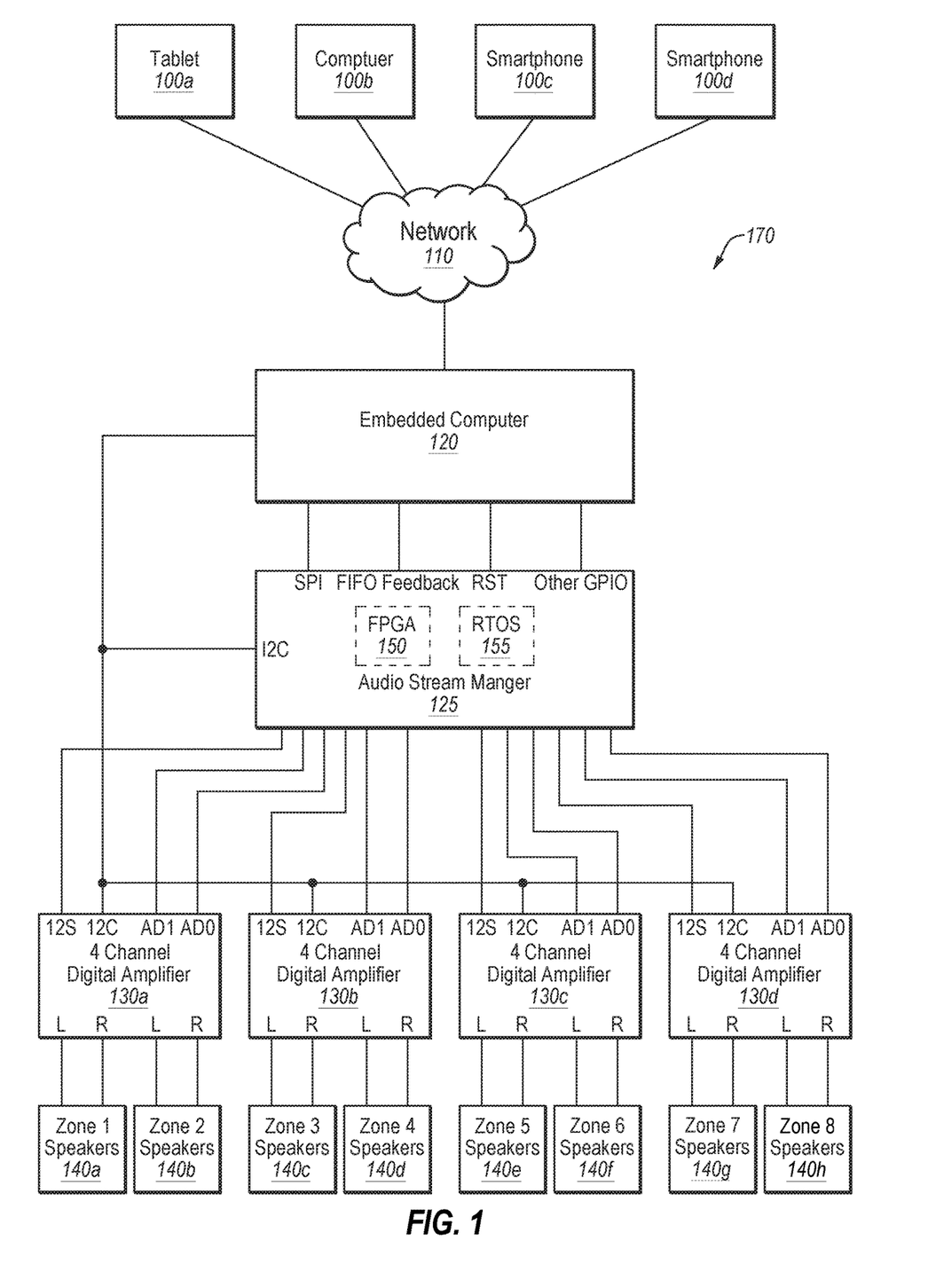
FIG. 1 is a block diagram illustrating a system capable of performing various aspects of the invention.

FIG. 1 is a block diagram illustrating a system 170 which is capable of performing various aspects of the invention. As is shown in FIG. 1, the system includes a plurality of various different devices 100a-100d, which are connected via a network 110 to an embedded computer 120. In this example, the devices 100a-100d include various smart devices (these may include a tablet 100a, a computer 100b, or smart phones 100c-d) connected to the embedded computer 120 over the network 110. It should be understood that any number of devices may be used in association with the present invention and the claims and scope of the intended meaning of the invention are not limited to those expressly described herein. Furthermore, it should be understood that the network 110 is a group of computer systems and other computing devices that are linked together via communication channels to facilitate communication and resource-sharing among users of the various computer systems and devices. Examples of networks 110 which may be used in association with the present invention include a Local Area Network (LAN), a Wide Area Network (WAN) including the Internet, a telecommunications network, or any other network which may receive a digital audio stream from a connected device 100a-100d.

The embedded computer 120 is connected to an audio stream manager 125. In one embodiment, the audio stream manager 125 may be a field programmable gate array 150 (FPGA). Alternatively, or additionally, the audio stream manager 125 may comprise or a microprocessor-based device running a real-time operating system (RTOS) 155, which may provide the same functionality described herein. In embodiments where the audio stream manager 125 comprises a microprocessor based device 155, the audio stream manager 125 and the embedded computer 120 may comprise a singular processor.

Lastly, the audio stream manager 125 is connected to a plurality of digital amplifiers 130a-130d, which in turn interface to connectors that connect to a plurality of speakers 140a-140h situated in different locations throughout a building or property. In one embodiment, the embedded computer 120 comprises a Raspberry Pi 3B, the audio stream manager 125 includes a FPGA 150 comprising an Intel MAX10 10M04SAE144, and a Texas Instruments TAS6424-Q1 for each of the digital amplifiers 130a-130d. At least the elements 120, 125, and 130a-130d shown in FIG. 1 may be contained on one or more printed circuit boards contained within an enclosure including a power supply. The following now describes these subsystems and connections in more detail.

As was previously described, a plurality of devices 100a-100d, in one embodiment comprising smart devices, capable of acting as digital audio sources are connected to the network 110. In one embodiment, the network 110 supports TCP/IP, and the particular means of connecting to said network 110 may include a cellular network, Ethernet and Wi-Fi, although other less common connection methods also exist. For example, a device 100a-100d may contain one or more audio files, including songs stored in a digital format; recordings created or stored by the devices 100a-100d, or the like. The audio data may also be transmitted over a network connection from online sources such as Apple Music, Spotify, or any other audio stream providing service or app that may be operating on the devices 100a-100d. This may include any streaming digital audio based on whatever other sources the device 100a-100d may be playing, such as YouTube videos and other multimedia content from the Internet, or from applications such as DirecTV, Netflix and Amazon Prime Video. In short, there are a large number of ways that the devices 100a-100d can supply a digital audio stream to the network 110, and there are a large number of possible sources of digital audio that may be generated and transmitted via said network 110. Further, it should be understood that the devices 100a-100d may utilize one network, such as a telecommunications network or cellular network to obtain the audio data which is subsequently streamed to the embedded computer 120 via a separate network 110.

In FIG. 1, a device 100a-100d capable of producing digital audio data passes said audio data to the embedded computer 120 over the network 110. The embedded computer 120 is connected to said network using an Ethernet connection such as an RJ-45, over Wi-Fi, or over cellular, or by other means in embodiments where the necessary radios and related equipment are included. The transmission of digital audio from the devices 100a-100d to the embedded computer 120 over the network 110 can be accomplished by copying entire songs or other digital audio tracks to the embedded computer 120, or by sending data packets in a sequential fashion, each representing one or more samples of an audio waveform. One example of the latter is Apple's AirPlay standard, which streams 32-bit PCM (pulse code modulation) samples, each representing a 16-bit signed value for a left speaker and a 16-bit signed value for a right speaker, at an average rate of 44.1 KHz. One embodiment uses one or more instances of open-source software libraries called Shairport Sync to allow the embedded computer 120 to act as one or more AirPlay receivers.

The embedded computer 120 buffers the audio data it receives, parses the stream, and then passes these streams to the audio stream manager 125. The interface between the embedded computer 120 and the audio stream manager 125 may consist of a series of digital, signal-level (typically at voltages such as 3.3V or 5V, although other voltages are sometimes used) wires. These wires are used to communicate information back and forth between the two subsystems. In the preferred embodiment, a serial peripheral interface is used, which is shown in the diagram as SPI. In one embodiment, the SPI connection consists of a word clock that delineates packet boundaries (often known as CS_BAR), a bit clock, a data bit representing values to be sent from the embedded computer 120 to the audio stream manager 125, which may be referred to as MOSI (master out, slave in), a data bit representing values to be sent from the audio stream manager 125 to the embedded computer 120, which is typically referred to as MISO (master in, slave out), and an optional system clock that typically operates at some integer multiple (usually a power of two) of the frequency of the bit clock. The data rate of the SPI interface may be chosen to be substantially higher than the data rate of the digital audio streams because it is desirable for the invention to support numerous simultaneous audio streams. For example, if the specific embodiment is to support 4 simultaneous audio streams, then the data rate of the SPI interface should be more than 4 times the data rate of the audio streams, because the interface protocol will add some overhead, and it may be necessary for data transmission to sometimes be faster than the average digital audio transmission rate in order to "catch up" after network lagging has causes delays between audio data samples. In one particular embodiment, the SPI speed is 15.6 MHz, which is a rate chosen to comfortably support 4 sources of 44.1 KHz audio data, which collectively represent a data rate of 5,644,800 bits per second.

The audio stream manager 125 may provide feedback over wires back to the embedded computer 120. This is represented in FIG. 1 as "FIFO Feedback." For each of the simultaneous sources, this feedback is in the form of 2-bit values, which have the meaning as follows: 00=almost full, 01=almost empty, 10=empty and 11=normal. In an alternative embodiment, this feedback can be carried back to the embedded computer 120 using the SPI connection via the MISO bit. Since the SPI connection is full duplex, when the embedded computer 120 sends packets to the FPGA, the audio stream manager 125 can simultaneously return bytes containing the status of each of the FIFOs by using the MOSI pin. In one embodiment, each 4-bit half byte is used to represent the status of the FIFO associated with each source. The values have meaning as follows: 0000=full, 0001=almost full, 0010=almost empty, 0011=empty, and 0100=normal.

A reset signal, shown in FIG. 1 as RST, is a signal that allows the embedded computer 120 to reset the audio stream manager 125.

The embedded computer 120 may also act as a master for a bidirectional serial communication interface. In the preferred embodiment, this is implemented using the I2C standard, which consists of a bus with two wires: a bidirectional data bit (often referred to as SDA), and a clock signal (often referred to SCL) provided by the master, which is the embedded computer 120 in this case. Various slave devices on the I2C network, such as each of a digital amplifier chips on each of the digital amplifiers 130a-130d, are coded to use specific addresses on the I2C network. To avoid collisions wherein two or more I2C-communicating digital amplifiers 130a-130d try to communicate using the same address, each has 2 address bits (shown in FIG. 1 as AD1 and AD0), with each address giving each digital amplifier 130a-130d a unique I2C address. In this embodiment, the audio stream manager 125 has outputs connected to AD1 and AD0 for each of the digital amplifiers 130a-130d. By controlling these outputs, the audio stream manager 125 is able to ensure that each digital amplifier 130a-130d can be accessed without interference from another. In FIG. 1, which shows an example with 4 digital amplifiers, AD1 and AD0 for each are set as follows: 00, 01, 10 and 11. In embodiments with more than 4 digital amplifiers, an additional step is used, and the audio stream manager 125 programmed accordingly. For example, a 32-zone system uses 16 digital amplifier chips, which are distributed among 6 logical banks. In this instance, 5 of the banks contain 3 amplifiers, and the sixth bank contains 1, for a total of 16. There are 3 bank-selection bits from the embedded computer 120 (represented in FIG. 1 as part of "Other GPIO," which stands for "other general-purpose inputs/outputs") to the audio stream manager 125. The bank-selection bits tell the audio stream manager 125 which of the banks a subsequent I2C communication is to be addressed. The audio stream manager 125 has gating logic such that if a bank is not selected, the address bits will be 00 for all three amplifiers in that bank. If the bank is selected, the address bits provided to each of the 3 amplifiers in that bank will be 01, 10 and 11 respectively. Then, the embedded computer 120 uses 1 of the 3 corresponding I2C addresses to communicate with the chosen digital amplifier 130a within the chosen bank. Since all of the digital amplifiers 130a-130d in all of the other banks have their AD1 and AD0 inputs set to 00, they will not respond. In this way, each of the 16 digital amplifiers 130a-130d may be uniquely accessed by the embedded computer 120.

The invention also allows the audio steam manager 125 to be programmed by the embedded computer 120, both during the manufacturing process, and also in the field to accommodate upgrades and additional features. The embedded computer 120 is able to use one or more of the various interfaces with the audio stream manager 125 shown in FIG. 1 to transmit new programming instructions to the audio stream manager 125. For example, some of the connections represented as "Other GPIO" in FIG. 1 are used to support the JTAG interface standard. Specifically, 4 of the pins are connected to the JTAG TMS, TCK, TDI and TDO pins on the audio stream manager 125, and another is connected to an enable pin. This allows the embedded computer 120 to transmit new synthesized HDL (hardware description language) code to the audio stream manager 125, thereby changing the functionality of the audio stream manager 125. In one embodiment, the embedded computer 120 receives a SVF (serial vector format) file via the network 100 (either because a user told the invention to check for an update, or because a server pushed an update to the invention) and stores it in its memory. The embedded computer 120 then uses the JTAG interface to transmit the SVF file to the audio stream manager 125, which either copies the new code to its nonvolatile memory, or to its static memory, and the audio stream manager 125 then begins to operate utilizing this new set of instructions.

Each digital amplifier 130a-130d, labeled in FIG. 1 as "4 Channel Digital Amplifier" has a series of outputs to drive speakers 140a-140h. These outputs are represented in FIG. 1 as "L", representing the output connections for the left speaker for each zone, and "R", representing the output connections for the right speaker for each zone. Each of the "L" and "R" connections consists of a positive connector and a negative connector. For example, the 8-zone system shown in FIG. 1 has 32 speaker connectors (i.e. 4 connectors per zone because each zone contains two speakers, and each speaker requires two connectors).

Figure 2:
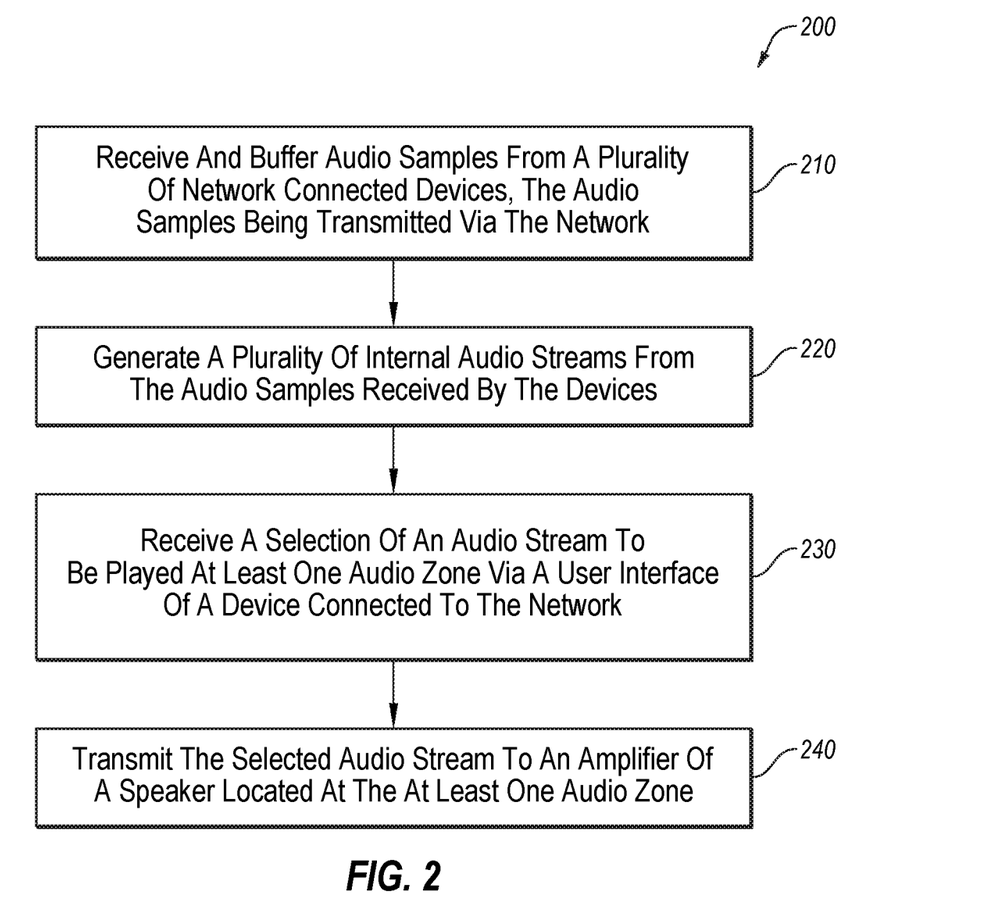
FIG. 2 is a block diagram illustrating a method of receiving a plurality of digital audio streams and providing audio output to a plurality of speakers in different locations.

FIG. 2 is a block diagram 200, which, in association with FIG. 1 illustrates a method of receiving a plurality of digital audio streams from a plurality of devices 100a-100d connected via a network 100 to an embedded computer 120 which transmits a selected digital audio stream to an amplifier 130a-130d connected to a speaker 140a associated with a zone where a user wishes the selected digital audio stream to be played. At 210, the embedded computer 120 receives digital audio streams from a plurality of sources 100a-100d. For example, it may receive independent streams from 4 different audio sources 100a-100d at the same time, as depicted in FIG. 1. In one embodiment, the embedded computer 120 is programmed to represent a plurality of AirPlay receivers, one for each simultaneous source. Alternative digital audio network protocols other than AirPlay may also be used. The embedded computer 120 receives these streams as they are sent, parses them, and pushes the samples into a FIFO buffer corresponding to each source. Then, using precise clocking (e.g. 44.1 KHz in the case of AirPlay and many other consumer digital audio technologies), an audio stream manager 125 checks each FIFO to see if it has a sample available. If a FIFO does have a sample available, the audio stream manager 125 pulls the oldest sample and stores it in an internal sample register at 220. The audio stream manager 125 begins to serially transmit this internal sample register as a sequence of bits using I2S. For example, each cycle of the I2S bit clock, the audio stream manager 125 assigns the most significant bit of the sample register to the internal I2S bit output register for that source, and then shifts the internal sample register left by one bit. This process is repeated until all of the bits of the sample register have been transmitted, and then the process repeats for the next sample. Lastly, the audio stream manager 125 performs the role of a large digital multiplexer with I2S inputs for each source and I2S outputs for each digital amplifier 130a-130d for each zone.

At 230, the embedded computer 120 receives a user selection of a particular audio stream of the plurality of audio streams which may be received by the embedded computer 120 from the devices 100a-100d to be played at a particular audio zone. This user selection is made via a user interface, such as those shown by way of example in FIG. 4, from a device 100a connected to the network 110. In some instances, the device 100a made to use this selection may be the same device 100a as which provides a selected audio stream. In other instances, the user may use a device 100a to select an audio stream which is available by another connected device 100b-100d. At 240, the audio manager connected to the embedded computer 120 uses the user selection to route the selected digital audio stream as appropriate. For example, if the user selection indicates that the audio from device 100c is to be played by a zone 4 speaker 140d, the audio stream manager 125 continuously copies the internal I2S signals from device 100c to physical output wires connected to the corresponding I2S digital inputs on the second digital amplifier chip of 130b. In one embodiment, all of the I2S signals except for the I2S data bit may be common, thereby limiting the number of signals that need to be multiplexed. In the preferred embodiment, each I2S signal is multiplexed independently, which provides flexibility in that separate and asynchronous digital audio streams can be handled.

Figure 3:
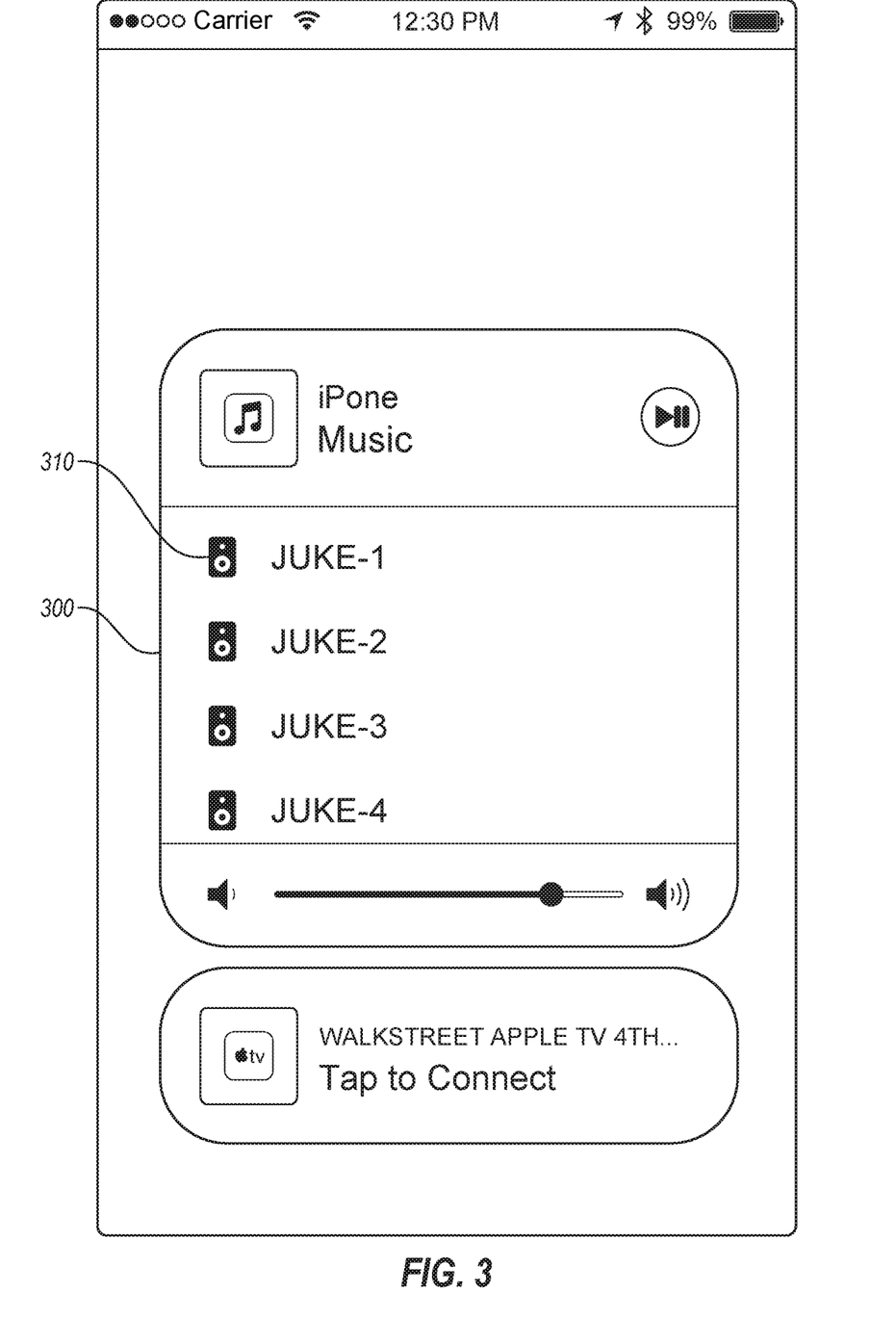
FIGS. 3-7 illustrate various user interfaces which may be used in association with the system and methods described herein.

FIG. 3 illustrates the means by which the user may interact with the embedded computer 120 by connecting to the embedded computer 120 via a device 100a. In this embodiment, the embedded computer 120 is visible on the network 110 as four different Airplay receivers (i.e. Juke-1 to Juke-4). In this embodiment, the user is able to use the device 100a to chose which Airplay receiver available via the embedded computer 120 to connect to.

Figure 4:
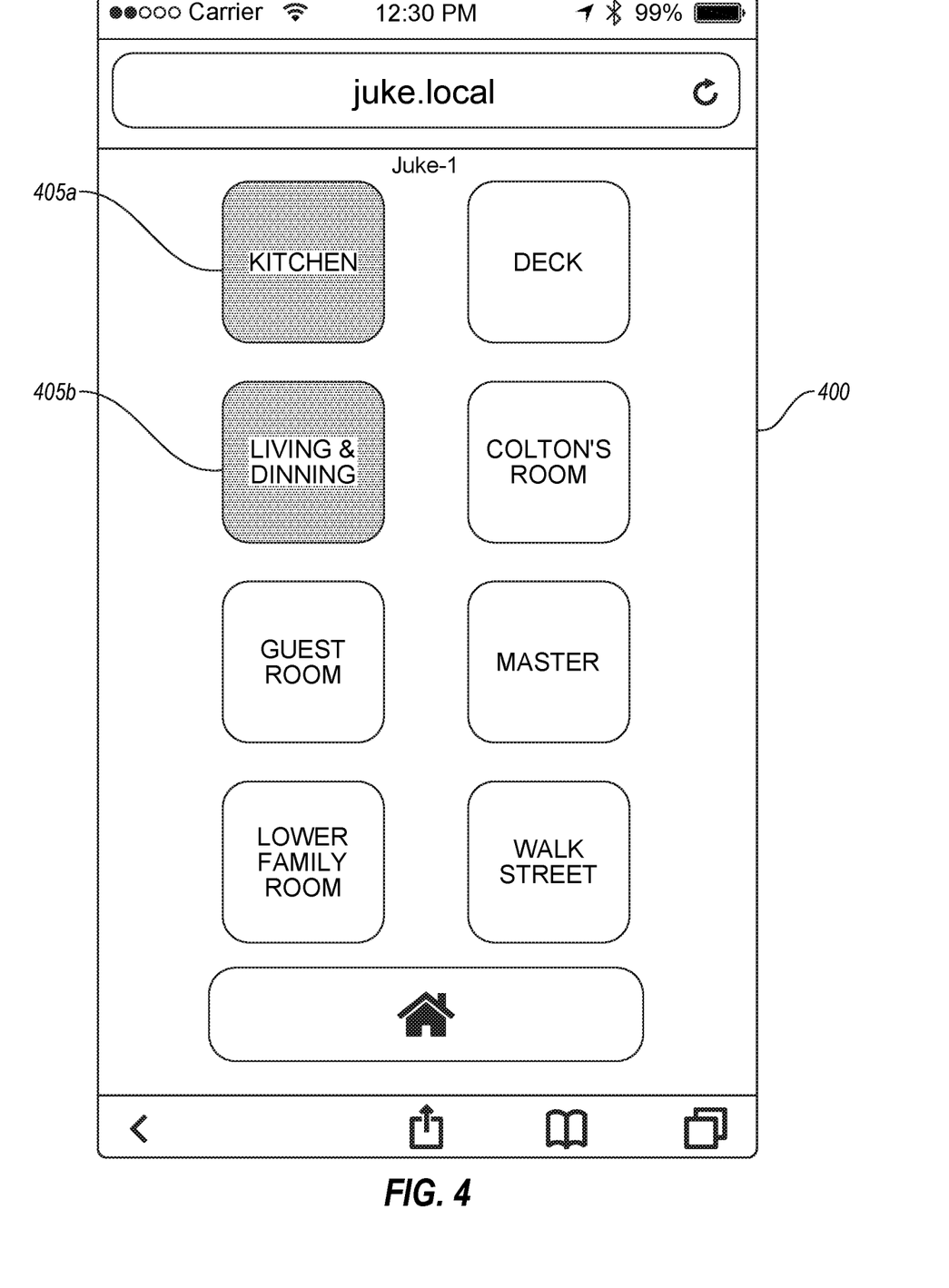
Figure 5:
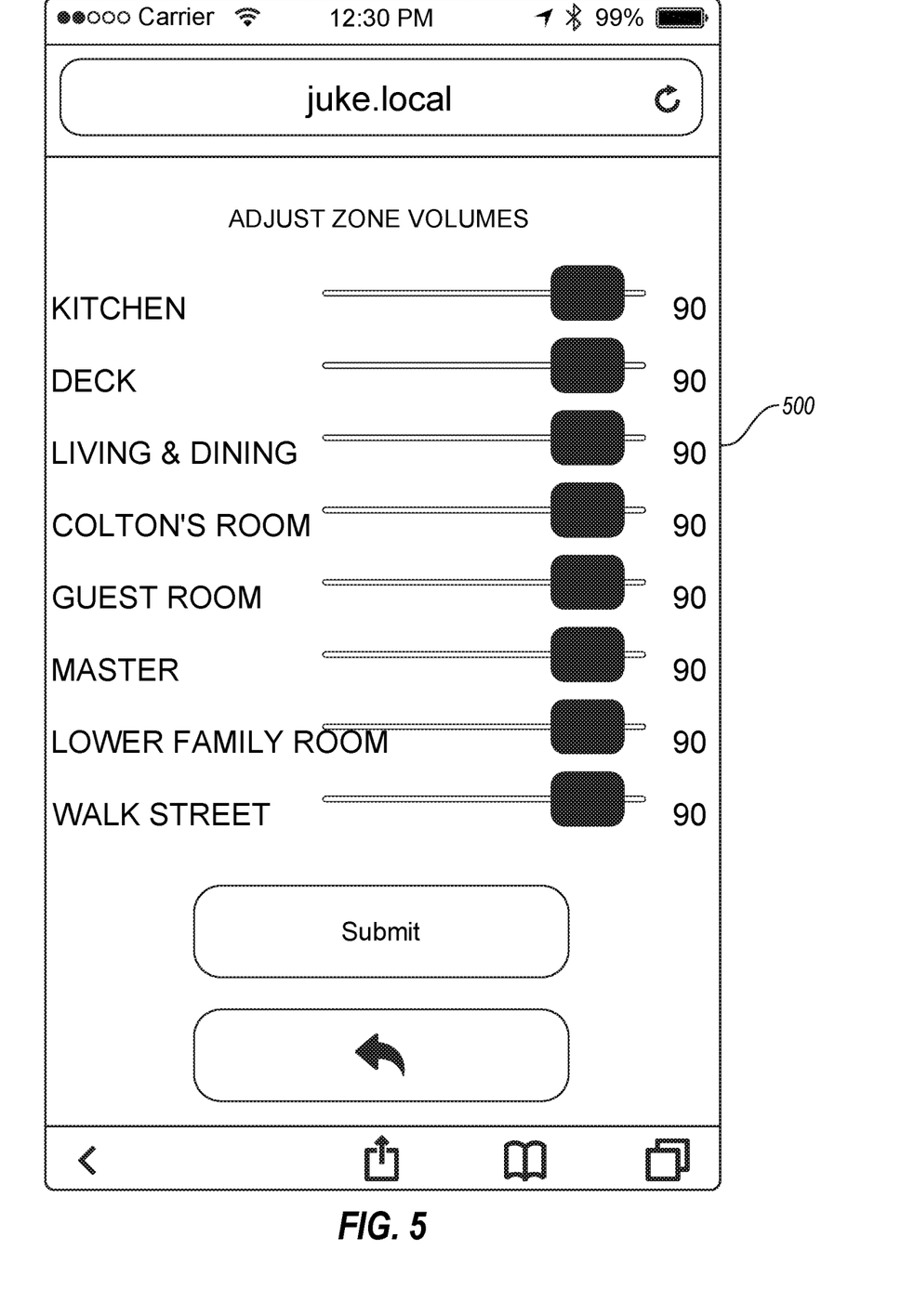
Figure 6:
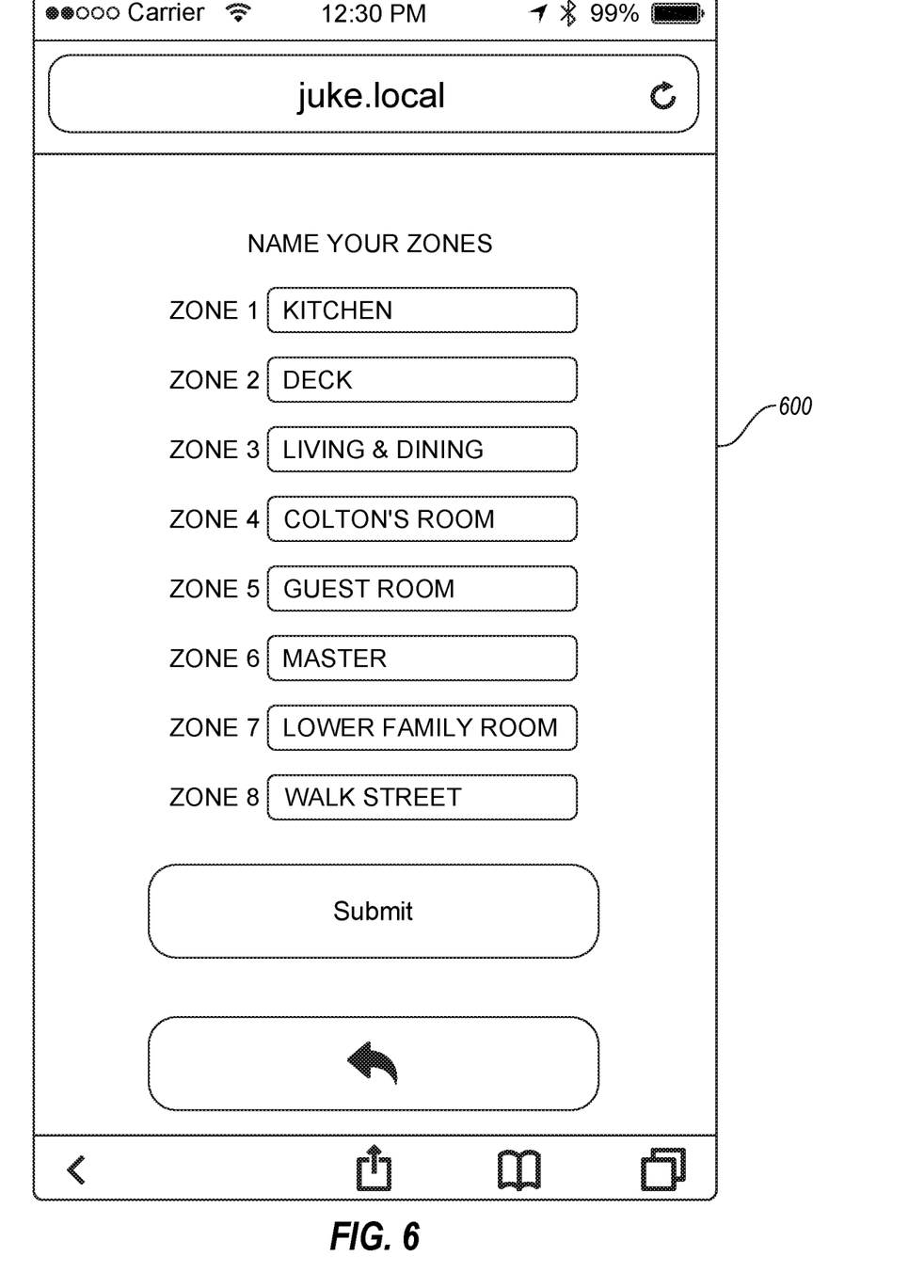

FIGS. 4-6 illustrate various examples user interfaces which may be used to control the embedded computer 120 and the audio stream manager 125 of the system. It should be understood that although in some instances the previous and following examples describe the interactions of device 110a, it should be understood that any of the devices 100b-100d may also interact with the embedded computer 125 in a similar manner.

The interfaces may be in the form of a smart device application (e.g. an iPhone or Android app), or a web interface whereby users control the system via web pages hosted by the embedded computer 120. In either case, the embedded computer 120 provides a series of screens to the device 100a which can be used to control the embedded computer 120 and, in turn, the audio stream manager 125. For example, if a user has chosen to stream music from their smart device 100c to the network 110, the user may utilize an internet browser connected to the embedded computer 120 via the user interface 300.

The user connects to a user interface 300 and selects a "Juke-1" selection button 310. Upon that selection, the user is directed to user interface 400 shown in FIG. 4 where the user is able to select which combination of zones should play the selected stream of music. For example, using the interface 400, the user may select both the "Kitchen" zone and the "Living & Dining" Zone by selecting buttons 405a or 405b, respectively and the music will be played to those two zones, but not the others. As may be described above, by selecting desired zones, the user may cause the embedded computer 120 and audio stream manager 125 to play the selected audio stream to the speakers corresponding the desired zones.

It should be understood that the user interface 400 may have a number of features to assist in user selection and may take a variety of different forms that are known in the art. For example, any number of selecting buttons, radio buttons, text input fields, dials, or the like may be used. Furthermore, in some instances, zones which are unavailable for selection, may not be illustrated in the selection menu or may be shown as being grayed out illustrating that the corresponding zone is unselectable. As is described more fully below, in some instances, a user may be able to log in as an administrator in order to set restrictions on which zones which may be played. In some instances, this may involve "locking" or designating some areas as not being available for playing audio streams during some preset times, days of the week, or the like. For example, parents or property owners may decide to limit the ability of children, guests, or tenants to play audio content in some zones (or any zones) during restricted hours or time periods, such as during designated "quiet hours" of a city or home owner's association. It should be further noted, that in other embodiments, an administrator may place volume controls to the various zones which may be individually or universally applied, depending on the user settings.

FIG. 5 illustrates another user interface 500 which may be used in association with the embodiments described herein. In the example shown in FIG. 5, an administrator or other user may adjust the relative volume of the various zones. FIG. 6 illustrates a user interface 600 which allows a user to name or rename various zones where the speakers 140a-140h are placed.

In some embodiments, the user interface is designed to function similarly to apps which are commonly used on smart devices. In one embodiment, the user opens an internet browser, such as Safari®, where the user enters a URL address, which directs the browser to a user interface for communicating with the embedded computer 120 and associated audio stream manager 125. In some instances, the system and methods described herein may utilize Apple's Bonjour protocol, where a URL address gets resolved to the IP address for the embedded computer 120 on the customer's local area network 110.

Figure 7:
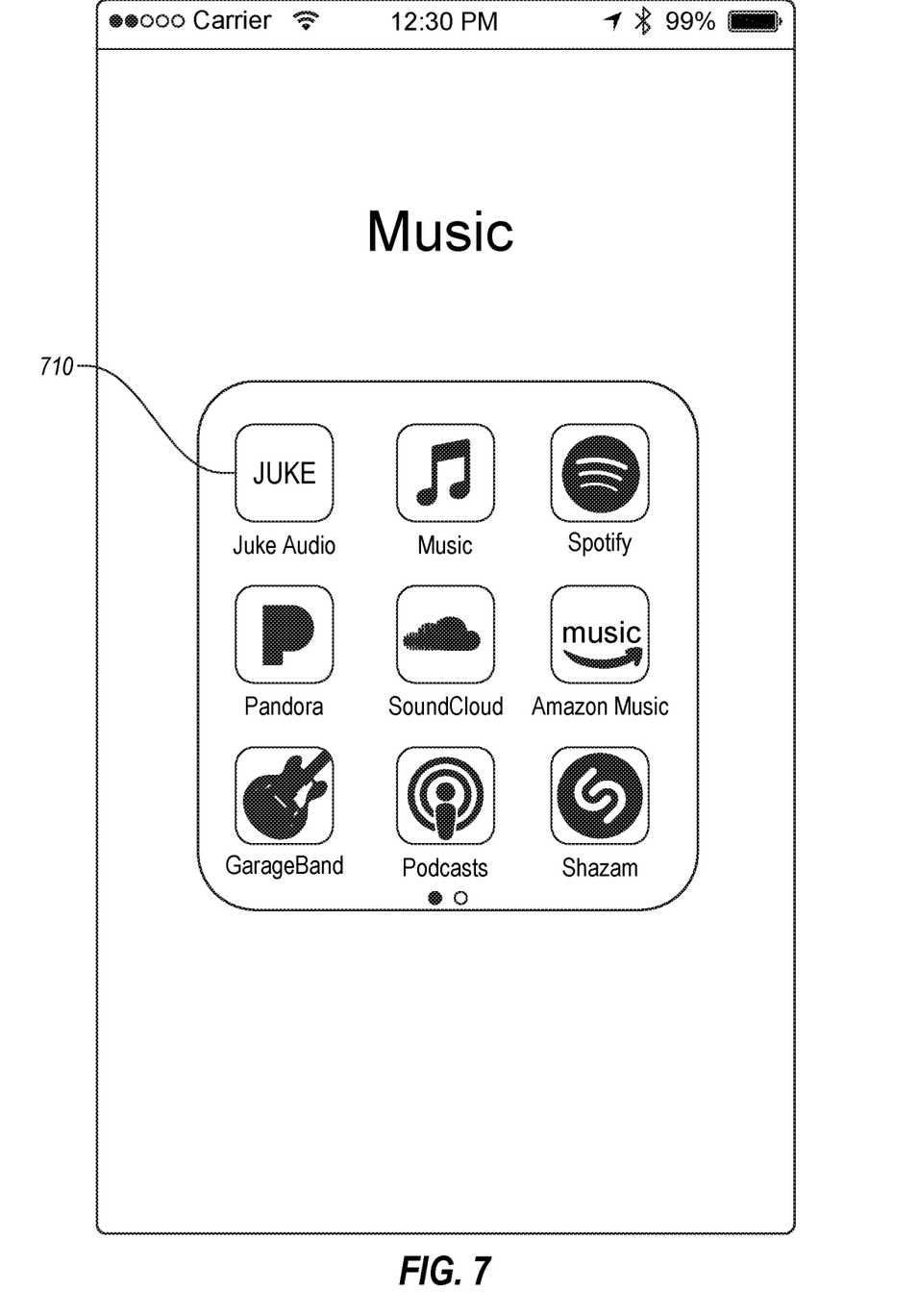

In some embodiments, the user can save a shortcut to URL address on the home screen of their device 100a, and in some instances the embedded computer 120 may then supplies the icon image which will then be displayed on the device 100a. One example of the icon 710 is illustrated in FIG. 7.

In one embodiment, when a user chooses to stream a selected audio stream to the embedded computer 120 and is directed to the interface, the embedded computer 120 is capable of detecting the IP address of the user device 100a and displays the zone control screen for that device 100a.

As may be understood, when a user presses a button for any of the zones displayed on the device 100a, the embedded computer 120a receives this command, causes the audio stream manager 125 to take the corresponding action with one or more of the digital amplifiers 130a-130d, by, for example, routing the audio stream from 100a to the chosen digital amplifiers 130a-130d. In one embodiment, the I2c network is mainly used to adjust the relative volumes of the amplifiers whereas the FPGA 150 provides digital audio stream buffering and multiplexes which zones play which streams.

It should be understood that in one embodiment, the embedded computer 120 and/or audio stream manager 125 contains a microprocessor and the necessary hardware to connect to the network 110. In one embodiment, the network connection is accomplished using Ethernet or Wi-Fi. The microprocessor may be implemented using the embedded computer 120, such as the Raspberry Pi 3 Model B, which contains a microprocessor, volatile and nonvolatile memory, built-in Wi-Fi, an Ethernet port, Bluetooth wireless and a variety of USB ports.

In one embodiment, when the embedded computer 120 is turned on, if it detects an Ethernet connection or other network connection, the embedded computer 120 makes use of it and receives an IP address from the network 110, unless it has been given a dedicated IP address during a prior configuration step. If there is no Ethernet connection but the embedded computer 120 has been previously configured to connect to a particular Wi-Fi network, it will do so using the SSID and password that it has stored in its memory. On initial setup, if Wi-Fi is to be used, the user has a number of choices. The user can connect to the embedded computer 120 using Bluetooth.

The embedded computer 120 is also capable of acting as an open access point so that the user can connect to it via Wi-Fi. Lastly, the embedded computer 120 can look for the SSID of a temporary access point provided by the user via their device 100a-100d as configured by software or applications that are provided along with the hardware of the invention. Once the user has established a connection to the embedded computer 120 using one of these means, the user is then able to program the SSID and password of a chosen Wi-Fi network, which the embedded computer 120 will then use from that point forward.

As was previously described, when connected to the network 110, the embedded computer 120 is able to receive digital audio streams from the one or more devices 100a-100d. These digital audio streams may consist of PCM (pulse code modulation) signals, each representing the value of a sample point on an audio waveform. One such example is Apple's AirPlay technology, which transmits 32-bit samples at a rate of 44.1 KHz, wherein the first 16 bits of each sample represent a PCM value for one speaker and the second 16 bits represent a PCM value for another. When one or more of these sample streams are transmitted over the network 110, various delays may be introduced because of network traffic and other factors. If the PCM streams where converted to analog, amplified and used to drive speakers, the sound would become distorted. To avoid this problem, this invention may include buffering such that a series of samples is received for each source and placed in a memory buffer, such as a FIFO (a first-in, first-out buffer). The FIFO is able to receive and hold a plurality of PCM samples which may be received at irregular intervals. Then, a decoder can withdraw PCM samples from the FIFO at a repeatable, precisely controlled interval. The decoder then passes a precisely spaced stream of samples to an amplifier, which in turn powers a speaker 140a-140h to produce audio output. One particular embodiment of this invention achieves the required buffering in a two-step process. The first step consists of the embedded computer 120 coupled to the network 110. The embedded computer 120 runs software that receives unevenly spaced PCM samples from digital audio sources 100a-100d connected to the network 110. Such sources include a variety of smart devices, as previously described.

The embedded computer 120 writes the samples it receives to a buffer in the order in which they are received. Then, the embedded computer 120 periodically delivers PCM samples to the second stage, which consists of the audio stream manager 125 which has been programmed to receive the data and perform a series of functions before delivering processed signals to the amplifiers 130a-130d. The audio stream manager 125 may be programmed in a variety of ways, including using languages such Verilog or VHDL. In one embodiment, where the audio stream manager 125 comprises a FPGA 150, specifically an Intel MAX10 10M04SAE144 chip programmed using Verilog. In an alternative embodiment, a real-time-operating-system-based microcomputer 155 may be used to perform the same role as that of the FPGA 150.

In the preferred embodiment, the embedded computer 120 is able to provide some measure of buffering to help deal with the irregular intervals at which the PCM samples are delivered via the network 110. However, because the embedded computer 120 needs to perform a variety of other tasks and maintain a network connection, it is difficult for the embedded computer 120 to deliver PCM data at a precise periodicity. However, in instances where a FPGA 150 is used, the FPGA 150 also contains FIFOs, and is able to hold a plurality of PCM samples received from the embedded computer 120. The FPGA 150 may be programmed such that each FIFO provides status information which is communicated back to the embedded computer 120. For example, if the FPGA 150 contains 75 samples or less, it will report its status as "almost empty." If it is 75 samples or less away from being full, it will report its status as "almost full." Between these states, it will report its status as "normal." The positions at which the FIFO reports its status as "almost empty" or "almost fill" may be adjusted based on network behavior to minimize the risk that the FIFO becomes either empty or full.

The interface between the embedded computer 120 and the FPGA 150 is a highspeed serial interface. It can also be implemented using a parallel interface. Through such interfaces, the FPGA 150 is able to receive PCM samples at a rate higher than the sampling frequency of the digital audio stream. The FPGA 150 then uses accurate clock signals to deliver precisely spaced samples to a digital amplifier. In one embodiment, the interface between the embedded computer 120 and the FPGA 150 is implemented using a serial interface standard called SPI (serial peripheral interface), consisting of a system clock, a bit clock, and a word clock that signifies the start and end of each data packet.

Clock Signal Generation

The digital audio subsystems of the invention may generate a number of precise clock signals that relate to one another in a defined manner. Digital audio sources deliver PCM samples of sound waveforms at a specific average rate, although the time spacing between samples may vary significantly depending on factors such as the traffic on the network. For example, Apple's AirPlay standard delivers samples at an average rate of 44.1 KHz. In order for good quality sound to be produced, a stream of samples need to be passed to each amplifier 130a-130d at the same rate, while ensuring that the time spacing between the samples is always the same. For the digital audio clock signals, the left/right clock signal is therefore generated at a rate of 44.1 KHz. The bit clock is 32 times faster since 32 bits need to be transmitted serially each cycle of the left/right clock. As such, the bit clock frequency is 1.4112 MHz. The system clock used by the digital amplifiers is 4 times faster than the bit clock, or 5.6448 MHz. In this embodiment, all of these clock signals are generated by the FPGA, which in turn uses an external clock generator to produce a very precise time base. While numerous external clock-generator frequencies could be chosen, in this embodiment, the external clock frequency is 50 MHz. This frequency is used as the system clock for various functions internal to the audio stream manager 125. As 50 MHz is not an integer multiple of 44.1 KHz, a FPGA 150 may use an internal phase locked loop to synthesize an internal clock of 90.3168 MHz, which is 16 times faster than the system clock used by the digital amplifiers 130a-130d, 64 times faster than the bit clock frequency and 2,048 times faster than the 44.1 KHz data rate of the PCM samples. The FPGA 150 may contain a 16 bit counter that is incremented every cycle of the 90.3168 MHz clock, so the least significant bit of the counter (referred to as the first bit) changes state with a frequency equal to half that of the 90.3168 MHz clock, or 45.1584 MHz. The fourth bit of the counter is 8 times slower than the first bit, and therefore is assigned to a register that represents the digital amplifier system clock. The sixth bit is 32 times slower than the first bit, and is therefore assign to a register that represents the bit clock, and the eleventh bit is 1,024 times slower, and is assign to a register that represents the left/right clock. In this manner, each of the required clock signals is efficiently generated, and precisely synchronized.

Zone Selection and Audio Stream Handling

As was previously described, embodiments described herein allow different audio streams to be played concurrently to different zones. For example, in a whole-home audio application, one user may wish to play music from their smart device to speakers in the family room, kitchen and dining room, whereas another user may wish to simultaneously play different music from their smart device to one of the bedrooms. The invention may achieve this through software-controlled digital multiplexing. In this particular embodiment, a user interface such as a smartphone application or web page hosted by the embedded computer 120, provides buttons that let users choose which sources are to be played to which zones. The embedded computer 120 receives this input from users, processes it, updates a log that retains these selections, and then sends commands to the audio stream manager 125, which in turn then routes that the appropriate sources to the appropriate amplifiers 130a-130d for each of the zone outputs. The log is stored in nonvolatile memory in the form of XML data, but could be stored as a flat file, database entry or other such means of maintaining these records. Changes to the source that is played by each zone are communicated from the embedded computer 120 via a digital interface with the audio stream manager 125. In one embodiment, the invention uses the same serial interface that it uses to pass PCM samples to a FPGA 150. Collectively, this is done using a protocol consisting of 9 8-bit bytes, although innumerable other approaches could be chosen. In the protocol, two messages are contained in each 9-byte packet. The first bit of the packet tells the FPGA 150 whether the first message is a PCM sample or a command to change which source is to be played by a specified zone. For example, if the first bit is a 1, then the FPGA 150 knows that the subsequent payload is a PCM sample. If the first bit is a 0, the FPGA 150 knows that the payload is a command to change a source/zone pairing. For example, if the first 4 bits are 0001, then the FPGA 150 knows that the first message represents a command to tell a zone to play source 1 since Bits 2 through 4 represent a source number from 0 (meaning no source is to be played) to 7. Bit 5 represents the flag for the second message with the same function as Bit 1 for the first message, and Bits 6 through 8 similarly represent the source for the second message. The subsequent 32 bits of the 9-byte packet represent either a PCM sample (if Bit 1 was a 1), or the zone (if Bit 1 was 0) that is to be set to play the source specified in bits 2 through 4. The final 32 bits of the 9-byte packet represent the same for the second message. The reason that the protocol sends two messages per packet is that doing so is very efficient in terms of bandwidth utilization for the transmission of PCM samples, ensuring that the packet contains whole bytes, as is typically required by SPI and other serial communication protocols.

So, the FPGA 150 continuously receives and decodes packets, each containing two messages in an identical format. If a message represents a PCM sample, the FPGA 150 writes that sample very quickly to an internal FIFO buffer for the source specified in the message. This can be accomplished in a variety of ways. In one particular embodiment, this transfer takes place using a clocked parallel interface: a write enable signal is asserted for the FIFO associated with the specified source, and that FIFO reads an input register containing the 32-bit PCM sample contained in the message upon each positive edge of the system clock during this assertion. Although other possible implementations exist, one embodiment has the width of each FIFO match the width of the audio stream PCM samples provided by the sources. For example, the width of each sample in AirPlay, and most common digital audio standards in use today, is 32 bits (16 bits for the left channel and 16 bits for the right), so the FIFO has a width of 32 bits.

In the case of a message containing a source/zone command (i.e. the leading bit is 0 rather than 1, in this protocol), the FPGA 150 updates a matrix. This matrix has a coded entry for each zone. Each coded entry contains a value representing a sources, or 0 or some other representation that tells the system that no source is to be played to that particular zone. The number of bits used by each coded value is chosen to allow for all available zones to be represented. In one embodiment, the system supports 4 simultaneous sources, so a 3-bit code is uses: 000 means no sources, 001 means source 1, 0010 means sources 2 and so on.

Power Supplies

The invention may be powered by a connection of the embedded computer 120 to a standard AC power source, typically 110 to 120 Vac in North America, and 220 to 240 Vac in some other parts of the world. In the preferred embodiment, the invention employs a high efficiency switching mode power supply capable of producing a nominal output voltage of 24 Vdc under a wide range of input voltage conditions. The power supply may be adjusted to a voltage several volts higher than 24 Vdc in order to deliver more power to the speakers 140a-140h. The output of the power supply is connected to the power inputs for each of the amplifier chips of amplifiers 130a-130d, and also to a DC/DC converter capable of generating a 5 Vdc output at approximately 1 Amp. The output of the DC/DC converter is used to power the embedded computer 120. In one embodiment, the embedded computer 120 is a Raspberry Pi, which in turn provides a 3.3 Vdc output on its GPIO connector, which is used to power a FPGA 150 of the audio stream manager 125, and the digital circuitry on each of the amplifier chips of the digital amplifiers 130a-130d.

Amplifiers

In this invention, amplifiers 130a-130d are provided to drive speakers 140a-140h located in different zones. Each amplifier 130a-130d is able to play a digital audio source as chosen by a user. There are numerous ways to accomplish this, such as using an analog multiplexer to map the input of a particular amplifier 130a to the output of a particular sources comprising a device 100a-100d. In the preferred embodiment of this invention, this function is accomplished digitally. Each amplifier 130a-130d accepts a digital PCM audio stream as its input. One implementation uses digital amplifier chips (such as the TAS6424-Q1 provided by Texas Instruments) which accept a variety of serial interfaces. While numerous alternatives exist, this invention uses an I2S interface wherein each amplifier accepts a system clock signal, a bit clock signal, a left/right clock signal and a data bit. The three clock signals exhibit precise timing thereby producing high quality audio via the amplifier. Each time the left/right clock goes low, the subsequent data bits (read each cycle of the bit clock) represent one speaker (e.g. the left one). When the left/right clock signal goes high again, the subsequent data bits represent another speaker (e.g. the right one). The system clock is required for the internal operation of the amplifier chip, and is 4 times faster than the bit clock in this particular implementation, although other multiples of the bit clock frequency could also be used. Each TAS6424-Q1 chip is capable of supporting two zones with two speakers per zone.

The TAS6424-Q1 may be powered by a wide range of voltages but in the preferred embodiment, this invention powers the chip at a voltage of greater than 12 Vdc (in this case, 24 to 26.4 Vdc) in order to maximize the power the invention is capable of delivering to the speakers 140a-140h, particularly to 8 Ohm speakers, which is the speaker impedance often found in architectural and freestanding speakers.

Volume Control

With this invention, a user is also able to simultaneously adjust the volume in all of the zones to which they are playing their audio. In one embodiment, this is accomplished by scaling the values in the PCM sample stream. For example, if a user is using the buttons on a smartphone to adjust the volume, the smartphone can scale the PCM samples being transmitted to the network 100. The invention receives these samples and uses them to drive the amplifiers 130a-130d, thereby resulting in volume adjustments at all of the corresponding speakers 140a-140h.

It is also important to allow different speakers 140a-140h to be driven at different relative volume levels. It is possible to design amplifiers in a variety of ways to accomplish this goal. In the preferred embodiment, each amplifier 130a-130d is able to accept digital commands (e.g. using an I2C interface) telling it the relative volume of each speaker 140a-140h. For example, the TAS6424-Q1 is capable of adjusting the relative volume of each speaker in 0.5 dB increments. These values are written as 8-bit values, with a hexadecimal value of 0xCF representing a nominal volume. A value of 0xD0 represents a volume 0.5 dB higher than nominal, and a value of 0xFF represents a volume that is 24 dB above nominal. Similarly, a value of 0xCE represents a relative volume that is 0.5 dB below nominal and a value of 0x07 represents a volume that is 100 dB below nominal. In an alternative embodiment, if a digital amplifier 130a-130d is used that does not support volume control, the FPGA 150 may provide this functionality by scaling the PCM samples prior to passing them to an amplifier 130a-130d for a particular speaker 140a-140h. Volume adjustments by powers of 2 can be achieved quickly using shift registers. For example, taking the 15 unsigned bits of a 16-bit sample and shifting them left increases the value represented by the sample by a factor of 2. Shifting the 15 unsigned bits to the right decreases the value of the sample by a factor of 2. Multiple shifts accomplish adjustments accordingly: by 2, by 4, by 8, by 16, and so on. Digital multipliers can also be used to increase or decrease the value of each PCM sample by a constant.

User Interface

The invention includes the capabilities to impose rules on different users, or on different zones. For example, a home owner may wish to restrict the maximum volume of speakers in certain locations during certain periods of time. Using a password-protected interface to access administrative features, the volume of children's bedrooms could be restricted to a certain level (say 20%) after 10 PM on school nights. This feature also supports the same functionality for multi-family housing, such as apartments and condominiums, hotels, and commercial spaces with numerous occupants. These rules can be adjusted remotely by the administrator over the Internet. For example, the owner of a home that the owner rents to tenants or operates as an Airbnb®, could restrict the volume levels of certain zones in order to comply with local requirements and avoid getting noise complaints from neighbors. The interface is very flexible in allowing the administrator to establish such rules. The software also records a log of the utilization of the system, logging which zones were used when, at what volume level, and by whom.

Additionally, the invention provides features for parties. Various guests can be given access to an application or to a web interface to the device. They are able to enter a queue to play music. When their turn comes, they will be able to stream their music to the system, which in turn is then distributed to chosen zones throughout the house. In this manner, music can be provided for a party not just by the host, but by the guests as well. The system owner maintains an ability to adjust the music queue and add and delete from the list of users who are able to contribute.

The invention also includes an interface to allow third-party systems to control the zone/source pairings and relative zone volumes. Such third-party systems include Amazon's Alexa and Apple's Siri. Spoken commands are passed to the embedded computer 120, or are passed to an application running on one or more servers and then to the embedded computer 120, which collectively parse the voice commands and turn them into control commands which perform the same functions as if these commands had been generated using the user interface. In addition, other third-party systems may send commands and read the status of the invention using a variety of digital means including HTTP packets, writing commands to pipes on the embedded computer over a network, or using serial UARTS.

One embodiment of the invention includes the ability to deliver feedback to the user via spoken words over the speakers themselves. The embedded computer 120 incorporates text-to-speech software libraries. Using these libraries, status information or other feedback can be converted to digital audio, which in turn can be passed to one or more of the source FIFOs, and then played by one or more of the zones. For example, if a user is trying to play music, but the connection between the user's smart device and the network is of insufficient bandwidth or is exhibiting intermittency, the speakers in the zone could say "I'm having trouble playing your audio because the connection between your smartphone and the network isn't reliable." Any other status information or feedback could be delivered in a similar way. This is a particularly nice feature if the user is using voice commands to control the product as the user will not need to go to an application or webpage in order to receive feedback.

One embodiment of the invention incorporates a web server on the embedded computer 120. One approach is to use open-source software such as the Apache Web Server. For example, if the embedded computer 120 is a Raspberry Pi running the Raspbian operating system, the Apache webserver can be installed by typing "sudo apt-get install apache2-y." While this allows the embedded computer 120 to display web pages, to enable more sophisticated command and control interactions with users, one embodiment also includes support for PHP, which can be installed on the Raspberry Pi by typing "sudo apt install php php-mbstring" when running Raspbian. The invention includes software written in HTML and PHP which displays the current status and relative volume of each of the zones. By "pressing" virtual buttons on a smart device display or computer screen, or by entering volume values into a table, the user is able to turn various zones on or off for a particular source, and also adjust the relative volume of each of the zones. This approach allows users to control the system from anywhere as long as they have access to the network containing the invention. Furthermore, the web interface provided by the embedded computer 120 allows monitoring and control even if the user has no application or client software installed: users can simply bring up a web page and interact with the system, which processes their commands and adjusts settings very rapidly. This is accomplished without requiring key pads or interfacing equipment. If a user is using an application to interact with the invention, this approach also reduces the complexity of the application, as it is able to interact with the embedded computer 120 using the same command set.

Features to Aid in System Installation

To install a system using the invention, a user simply connects positive and negative electrical wires for each of the left and right speakers 140a-140h for each zone in the system. The system supports a plurality of zones. In order to use the system, a user can program familiar names for each of the zones, as is shown in FIG. 6. For example, the speakers connected to the speaker connectors for Zone 1 might be located in the kitchen. A user is able to go to an application or webpage on their smart device and tell the embedded computer that Zone 1 should be called "Kitchen." Similarly, Zone 2 might be called "Living Room", Zone 3 might be called "Master Bedroom" and so on. If the user has not noted which speaker wires connect to each room, this can be confusing. In one embodiment, the invention is able to use text-to-speed to play audio to each zone in sequence. If the user is in a particular room, the speakers in that room will annunciate the zone number associated with that room. The user can then use the interface to specify the familiar name for that room. In one embodiment, an application a user is running on their smart device uses its internal microphone to listen for a signal from a speaker, thereby automatically learning the zone in which the user is currently located, and then allows the user to enter the familiar name for that zone. Alternatively, the user could say the name of the zone, in which case the application coverts their speech to text and records their words as the name for the zone.

In addition, the invention detects and/or corrects for common installation errors. If the positive and negative wires of a speaker are backwards, that speaker will play audio that is 180 degrees out of phase with other speakers that are wired correctly, thereby producing less than satisfactory listening quality. During installation, the embedded computer plays a tone at a particular frequency, say 2 KHz. The associated application on a smart device listens to the audio being produced by each speaker. By comparing the phase of the audio signal that is being provided to the phase of the audio signal that the application hears from the speaker, the invention is able to detect any speakers that are wired incorrectly. The invention reports this to the user, either using text-to-speech to a particular speaker providing spoken feedback such as "My wires are crossed. Please switch the wires you have connected to my positive and negative terminals," or this can be reported to the user via the smart device interface. In addition, the device can offer to correct for the wiring error digitally from that point forward rather than requiring the user to adjust the wiring. Similarly, it is common for the wires for the left speaker and right speaker to be inadvertently switched. In this case, in an analogous fashion, the invention can report this to the user and/or offer to correct for this error digitally from that point forward. Lastly, the embedded computer 120 is able to measure the approximate impedance of each speaker, detect any broken wires, short circuits, or simply to detect that a speaker is not presently connected to the system. This is done by the embedded computer 120 sending digital commands to the amplifier chips (such as the TAS6424 by Texas Instruments) of the digital amplifiers 130a-130d that incorporate these diagnostic features.

Another approach, when the amplifiers 130a-130d lack this type of diagnostic capability, is to play audio to each speaker in sequence, and measure the change in the power consumption of the invention using an analog to digital converter to measure the current consumed by the invention. The increase in the square of the current is proportional to the increase in power associated with supplying the amplifier for the particular speaker under test. Since the efficiency of the amplifier is known, the invention is able to measure the approximate impedance of the speaker 140a-140h. If a speaker wire is broken or disconnected, there will be very little increase in power consumption since the amplifier 130a-130d is driving an open circuit. This situation is recorded as a broken speaker wire or otherwise disconnected speaker. If, conversely, the speaker wires are short circuited, as the amplifier 130a-130d tries to supply power, current consumption will climb rapidly. By detecting this inappropriate increase in current, the invention is able to detect a short circuit condition.

Additional Embodiments

In one embodiment, the embedded computer 120 may be used to perform an intercom function. For example, a microphone operating on or in association with the device 100a-100d connected to the embedded computer 120 via the network 110 may be broadcasted to selected zones via the embedded computer 120 and the audio stream manager 125 connected to the digital amplifier 130a-130d. In this embodiment, a user may select the microphone on their smartphone 100c to broadcast a captured audio stream to be broadcast to other areas of the house via the embedded computer 120.

In another embodiment, the embedded computer 120 may be configured to perform additional functions, such enable a user using a device 100a-100d to connect to the embedded computer 120 to set an alarm to be broadcast to a selected zone of the house. In some configurations, the embedded computer 120 may use an internal clock or a network connection to an external clock to determine when to broadcast an alarm broadcast to the speakers 140a-140h of a selected zone. Using this embodiment, a parent may user their own device 100a-100d to set an alarm which would be broadcast in one of their children's room.

In another embodiment, the embedded computer 120 and corresponding audio stream manager 125 may be connected to a civic emergency broadcast system, via the network 100. As such, the user, using a device 100a may opt into emergency broadcast messages to be transmitted to selected zones of their home. As may be understood, this may be advantageous in areas where there is an increased likelihood of emergency situations and where receiving an emergency notification as quickly as possible would be advantageous. For example, in settings where a user is living in an area which is prone to specific types of natural disasters, such as earthquakes, tornados, tsunamis, floods, hurricanes, fires, or the like, the user may elect to have alarms transmitted throughout selected portions of their home. As may be understood, this provides the advantage of not requiring a user to have his or her smartphone nearby or their television or radio broadcasting at the time of an alarm. Rather, the embedded computer 120 may receive the notification directly from an emergency broadcast system without requiring a separate alarm being transmitted to the embedded computer by the device 100a-100d.

In yet another embodiment, the embedded computer 120 may also be used to super-impose a requested audio stream over another audio stream as selected by a user. For example, a user may select that a high frequency audio signal may be broadcast to a selected zone, such as a patio area of a home, wherein the high frequency audio signal may be specifically selected to be at a frequency which is not audible by humans, but which is audible to other living organisms and which may be used to dispel or deter insects or animals from entering the selected zone. In further embodiments, the high frequency audio signal may also be super-imposed over another selected audio stream so as to generate two different ranges of frequencies, one which would be audible to human guests or occupants of the specified zone and another would serve to repel unwanted insects or animals. As may be understood, this may be desirable in outdoor party settings so as to provide a pleasant outdoor entertaining experience (e.g. listening to music) where a host or hostess would be able to simultaneously discourage insects or pests from intruding on the space.

It should be understood that modifications, additions, or omissions may be made to system 170 without departing from the scope of the present disclosure. For example, although the embedded computer 120 and the audio stream manager 125 are shown in FIG. 1 as being two separate components, it should be understood that they may be combined into a single integrated component. Similarly, the digital amplifiers 130a-130d may also be combined with the audio stream manager 125 and, in some instances, both the audio stream manager 125 and the embedded computer 120.

Figure 8:
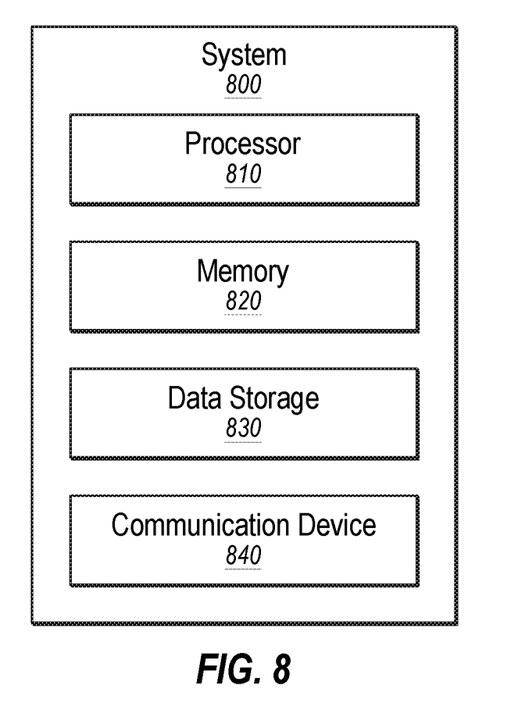
FIG. 8 is a block diagram illustrating a computing device capable of performing embodiments described herein.

Further, as indicated above, the embodiments described herein may include the use of a special purpose or general purpose computer (e.g., processor 810 of FIG. 8) including various computer hardware or software modules, as discussed in greater detail below. Further, as indicated above, embodiments described herein may be implemented using computer-readable media (e.g., memory 820 or data storage 830 of FIG. 8) for carrying or having computer-executable instructions or data structures stored thereon.

As used in the present disclosure, the terms "manager," "module," or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A digital multi-zone audio system comprising:
an embedded computing device connected to a plurality of computing devices via a network and which is configured to receive a plurality of digital audio streams from each of the plurality of computing devices, the embedded computing device being further configured to cause a user device connected to the embedded computing device via the network to display on the user device a user interface including a listing of a plurality of zones where a digital audio stream from the user device may be played via a plurality of speakers disposed in respective locations of the plurality of zones; and
an audio stream manager connected to and in communication with the embedded computing device and a plurality of digital amplifiers, each of which is connected to at least one of the plurality of speakers, the audio stream manager being configured to:
receive the plurality of digital audio streams and a user selection of a selected digital audio stream of the plurality of digital audio streams and one or more target zones of the plurality of zones where the selected digital audio stream is to be played, and
transmit the selected digital audio stream to a corresponding digital amplifier of the plurality of digital amplifiers, the corresponding digital amplifier being connected to a speaker of the plurality of speakers in a respective location of the target zone, causing the selected digital audio stream to be played to the target zone.

2. The digital multi-zone audio system of claim 1, wherein the audio stream manager is a field programmable gate array.

3. The digital multi-zone audio system of claim 1, wherein the audio stream manager is a microprocessor running a real-time operating system.

4. The digital multi-zone audio system of claim 1, wherein the embedded computing device comprises a Raspberry Pi 3B.

5. The digital multi-zone audio system of claim 1, wherein the plurality of speakers are situated in different locations throughout a building or property and the plurality of zones correspond to the different locations of the building or property.

6. The digital multi-zone audio system of claim 5, wherein the listing of the plurality of zones in the user interface are designated in the listing according to the corresponding locations of the building or property.

7. The digital multi-zone audio system of claim 1, wherein the user selection also includes a volume setting indicating a volume level at which the selected digital audio stream is to be played.

8. The digital multi-zone audio system of claim 1, wherein the user selection also includes a series of restrictions which may be set by an administrator indicating specified times when digital audio streams may not be played by the digital multi-zone audio system.

9. A method of performing multi-zone and multi-source digital audio playback, the method comprising:
receiving, at an embedded computer, a plurality of digital audio streams from a plurality of computing devices connected to the embedded computer via a network connection;
causing a user device to display on a user interface of the user device a listing of a plurality of zones at physical locations where a digital audio stream of the user device may be played via a plurality of speakers disposed in respective locations of the plurality of zones;

receiving, by an audio stream manager, the plurality of digital audio streams and a user selection of a selected digital audio stream of the plurality of digital audio stream and one or more target zones of the plurality of zones where the selected digital audio stream is to be played, the user selection being made via the user interface, where the audio stream manager is connected to and in communication with the embedded computer and a plurality of digital amplifiers, each of which is connected to at least one of the plurality of speakers; and transmitting, by the audio stream manager, the selected digital audio stream to a corresponding digital amplifier of the plurality of digital amplifiers, the corresponding digital amplifier being connected to a speaker of the plurality of speakers in a respective location of the target zone, causing the selected digital audio stream to be played to the target zone.

10. The method of claim 9, wherein the audio stream manager comprises a field programmable gate array.

11. The method of claim 9, wherein the audio stream manager comprises a microprocessor running a real-time operating system.

12. The method of claim 9, wherein the embedded computer comprises a Raspberry Pi 3B.

13. The method of claim 9, wherein the plurality of speakers are situated in different locations throughout a building or property and the plurality of zones correspond to the different locations of the building or property.

14. The method of claim 13, wherein the listing of the plurality of zones in the user interface are designated in the listing according to the corresponding locations of the building or property.

15. The method of claim 9, wherein the user selection also includes a volume setting indicating a volume level at which the selected digital audio stream is to be played.

16. The method of claim 9, wherein the user selection also includes a series of restrictions which may be set by the user comprising an administrator indicating specified times when digital audio streams may not be played by the plurality of speakers.

17. A non-transitory computer-readable medium having encoded therein programming code executable to perform or control performance of operations comprising:

receiving, at an embedded computer, a plurality of digital audio streams from a plurality of computing devices connected to the embedded computer via a network connection;

causing a user device to display on a user interface of the user device a listing of a plurality of zones at physical locations where a digital audio stream of the user device may be played via a plurality of speakers disposed in respective locations of the plurality of zones;

receiving, by an audio stream manager, the plurality of digital audio streams and a user selection of a selected digital audio stream of the plurality of digital audio streams and one or more target zones of the plurality of zones where the selected digital audio stream is to be played, the user selection being made via the user interface, where the audio stream manager is connected to and in communication with the embedded computer and a plurality of digital amplifiers, each of which is connected to at least one of the plurality of speakers; and transmitting, by the audio stream manager, the selected digital audio stream to a corresponding digital amplifier of the plurality of digital amplifiers, the corresponding digital amplifier being connected to at least one speaker of the plurality of speakers in a respective location of the target zone, causing the selected digital audio stream to be played to the target zone.

18. The non-transitory computer-readable medium of claim 17, wherein the audio stream manager comprises a field programmable gate array ray.

19. The non-transitory computer-readable medium of claim 17, wherein the audio stream manager comprises a microprocessor running a real-time operating system.

20. The non-transitory computer-readable medium of claim 17, wherein the embedded computer comprises a Raspberry Pi 3B.

* * * * *